(12) United States Patent
Louca et al.

(10) Patent No.: US 12,654,663 B2
(45) Date of Patent: Jun. 16, 2026

(54) EMERGENCY BRAKE VALVE SYSTEM FOR A PNEUMATIC BRAKE SYSTEM

(71) Applicant: KNORR-BREMSE SYSTEME FÜR SCHIENENFAHRZEUGE GMBH, Munich (DE)

(72) Inventors: Sebastian Louca, Munich (DE); Maximillian Schmidt, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 1066 days.

(21) Appl. No.: 17/613,843

(22) PCT Filed: May 14, 2020

(86) PCT No.: PCT/EP2020/063460
§ 371 (c)(1),
(2) Date: Nov. 23, 2021

(87) PCT Pub. No.: WO2020/234109
PCT Pub. Date: Nov. 26, 2020

(65) Prior Publication Data
US 2022/0227339 A1 Jul. 21, 2022

(30) Foreign Application Priority Data
May 23, 2019 (DE) ..................... 10 2019 113 753.5

(51) Int. Cl.
B60T 8/32 (2006.01)
B60T 13/66 (2006.01)
(Continued)

(52) U.S. Cl.
CPC ............ B60T 8/327 (2013.01); B60T 13/665 (2013.01); B60T 13/683 (2013.01); B60T 17/228 (2013.01); B60T 2270/402 (2013.01)

(58) Field of Classification Search
CPC ........ B60T 8/327; B60T 8/1705; B60T 7/128; B60T 2270/402; B60T 13/665; B60T 13/683; B60T 17/228
See application file for complete search history.

(56) References Cited

U.S. PATENT DOCUMENTS

| 5,881,768 A | 3/1999 | Bezos et al. | |
| 2010/0295366 A1 * | 11/2010 | Bradley | ............... B60T 8/3235 |
| | | | 303/133 |

(Continued)

FOREIGN PATENT DOCUMENTS

| CN | 111065561 A * | 4/2020 | ............. B60T 13/26 |
| DE | 102006018554 B3 | 1/2008 | |

(Continued)

OTHER PUBLICATIONS

International Search Report and Written Opinion corresponding to PCT/EP2020/063460 dated Aug. 4, 2020.

*Primary Examiner* — Vishal R Sahni
(74) *Attorney, Agent, or Firm* — Barnes & Thornburg LLP

(57) ABSTRACT

An emergency brake valve system for a pneumatic brake system of a vehicle, in particular of a rail vehicle, includes a first valve and a second valve, wherein the first valve is configured to conduct an auxiliary pressure to, or isolate this from, the second valve, whereas the second valve is configured to provide either a static or a regulated pressure in a manner which is dependent on the auxiliary pressure. The first valve is configured in such a way that it isolates the prevailing auxiliary pressure from the second valve in regular operation, with the result that the second valve provides a regulated pressure, and that it conducts the prevailing auxiliary pressure to the second valve in emergency operation, with the result that the second valve provides a static pressure.

10 Claims, 3 Drawing Sheets

| Output pressure ($p_{Aus}$) | | Energizing of solenoid valve | |
|---|---|---|---|
| | | Yes | No |
| Availability of auxiliary pressure (3A) | Yes | $p_{ger}$ | $p_{stat}$ |
| | No | $p_{stat}$ | $p_{stat}$ |

(51) Int. Cl.
    *B60T 13/68*          (2006.01)
    *B60T 17/22*          (2006.01)

(56)             References Cited

U.S. PATENT DOCUMENTS

| | | | |
|---|---|---|---|
| 2012/0286563 A1 | 11/2012 | Lichterfeld et al. | |
| 2017/0267221 A1* | 9/2017 | Hecker | ............... B60T 7/085 |

FOREIGN PATENT DOCUMENTS

| | | | | |
|---|---|---|---|---|
| DE | 102008012700 | B3 | 6/2009 | |
| DE | 102009016986 | B3 | 6/2009 | |
| DE | 102010005091 | A1 | 7/2011 | |
| DE | 102018200487 | A1 | 7/2019 | |
| EP | 0738640 | A2 | 10/1996 | |
| EP | 1847432 | B1 | 8/2018 | |
| EP | 3737594 | B1 | 10/2021 | |
| JP | 2012131267 | A | 7/2012 | |
| WO | 2014119447 | A1 | 8/2014 | |
| WO | WO-2015154788 | A1 * | 10/2015 | ............. B60T 13/68 |
| WO | WO-2019119497 | A1 * | 6/2019 | ............. B60T 13/36 |

* cited by examiner

| Output pressure ($p_{Aus}$) | | Energizing of solenoid valve | |
|---|---|---|---|
| | | Yes | No |
| Availability of auxiliary pressure (3A) | Yes | $p_{ger}$ | $p_{stat}$ |
| | No | $p_{stat}$ | $p_{stat}$ |

| Output pressure ($p_{Aus}$) | | Energizing of solenoid valve | |
|---|---|---|---|
| | | Yes | No |
| Availability of auxiliary pressure (3A) | Yes | $p_{ger}$ | $p_{stat}$ |
| | No | $p_{ger}$ | $p_{ger}$ |

EMERGENCY BRAKE VALVE SYSTEM FOR A PNEUMATIC BRAKE SYSTEM

CROSS REFERENCE AND PRIORITY CLAIM

This patent application is a U.S. National Phase of International Patent Application No. PCT/EP2020/063460 filed May 14, 2020, which claims priority to German Patent Application No. 10 2019 113 753.5, the disclosure of which being incorporated herein by reference in their entireties.

FIELD

The invention concerns an emergency brake valve system for a pneumatic brake system in a vehicle, in particular in a rail vehicle. Using the emergency brake valve system, in an emergency situation, it is possible to safely provide the brake pressure necessary for braking by switching to an alternative path, and then change back to a controllable brake pressure.

BACKGROUND

In modern brake systems of rail vehicles, in the case of an emergency braking, the system switches from a regulated pressure to a static pressure in order to conduct this to the brake cylinders as a safe brake pressure and, thus, guarantee a prompt and safe braking. To this end, usually an emergency brake valve system, normally equipped with a solenoid valve, is switched electrically.

The regulated pressure, which can be used as a brake pressure in regular operation, may be monitored and vented if no braking need be performed. This pressure is generated for example by an electronic pressure regulator or a pneumatic control valve.

The static pressure however, which is conducted to the brake cylinders in the case of an emergency braking, is normally fixed at the necessary brake pressure level of an emergency braking in order to be able to provide a safe brake pressure at the appropriate level in an emergency. It cannot therefore normally be vented.

SUMMARY

Disclosed embodiments provide an emergency brake valve system for a pneumatic brake system, which allows a regulated pressure to be used as the brake pressure after an emergency braking if the static pressure has been isolated and vented.

BRIEF DESCRIPTION OF FIGURES

Disclosed embodiments are explained in more detail below with reference to the appended figures. The drawing show in detail.

Figures 1, 2:
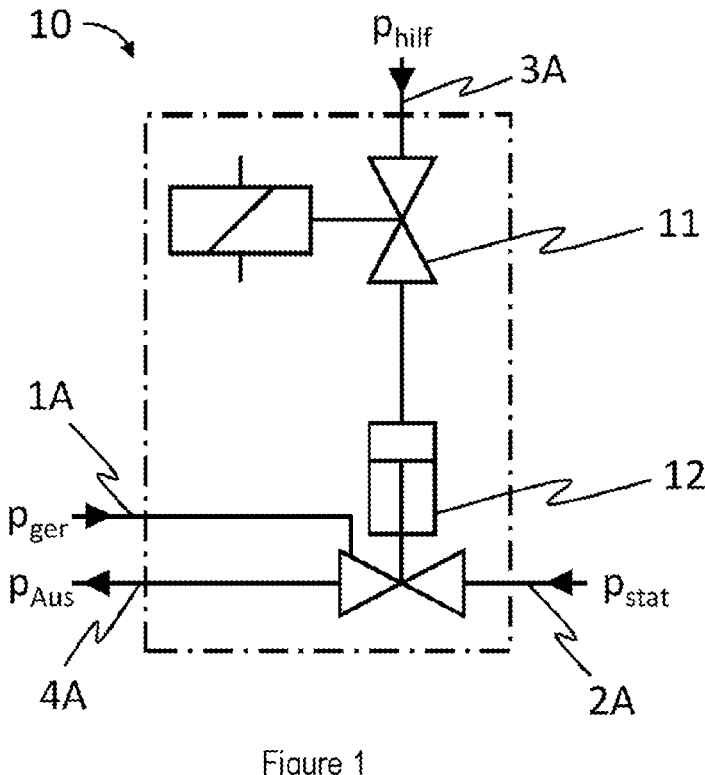
FIG. 1 an emergency brake valve system according to the prior art.
FIG. 2 a table to illustrate the provision of the output pressure according to the prior art.

DETAILED DESCRIPTION to be able to switch from the regulated pressure to the static pressure in an emergency, usually an above-mentioned emergency brake valve system is used. This normally contains a solenoid valve for controlling the system, which is energized in normal operation (low active) and in this state conducts a regulated pressure to the brake cylinders via a further piston valve. In the case of emergency braking, the power supply to the solenoid valve is interrupted, whereby this switches to its non-energized basic position, wherein the solenoid valve is configured such that the regulated pressure is, thus, isolated and a static pressure is conducted to the brake cylinders as the brake pressure.

In order to eliminate the emergency braking again, the solenoid valve must be re-energized so that it can leave its non-energized basic position and again conduct the regulated pressure to the brake cylinders as the brake pressure. If energizing of the solenoid valve is not possible in an emergency situation, the static pressure is still present at the brake cylinders as a brake pressure. This pressure cannot however be controlled or released or vented in order to tow the vehicle for example. Thus the static pressure can only be isolated and vented, whereby however no brake pressure is then present at the brake cylinders and hence no monitored control of the braking is possible. Accordingly, disclosed embodiments provide an emergency brake valve system for a pneumatic brake system, which allows a regulated pressure to be used as the brake pressure after an emergency braking if the static pressure has been isolated and vented.

The emergency brake valve system may be part of a brake controller of a vehicle and has two valves. The first valve is configured so as to conduct an auxiliary pressure to or isolate this from the second valve. The second valve however is configured so as to provide either a static or a regulated pressure depending on the auxiliary pressure. Furthermore, the first valve is configured so as to isolate the auxiliary pressure from the second valve in regular operation, and thereby switch this such that the second valve provides the regulated pressure. In emergency operation, however, the first valve is configured so as to conduct the auxiliary pressure to the second valve, so that the second valve provides a static pressure at the pressure output. On an emergency braking therefore, the static pressure is available as the brake pressure.

The emergency brake valve system may allow the regulated pressure to be available again as a brake pressure, after emergency braking by the static pressure, by simple isolation and venting of the auxiliary pressure, for example, via a mechanical valve. Thus, it is possible, after an emergency braking, to release the brakes without actuating the first valve, to tow the vehicle and provide an adjustable brake pressure by the regulated pressure.

Optionally, the pressure provided by the second valve is the output pressure of the emergency brake valve system.

Optionally, the output pressure provided by the second valve of the emergency brake valve system is the brake pressure which is present at the brake cylinders of the pneumatic brake system.

Optionally, the first pressure input and/or the second pressure input are provided on the second valve. In another advantageous embodiment of the invention, the pressure output is provided on the second valve. Such an embodiment has the advantage that the position of the second valve can directly influence whether the static pressure or the regulated pressure is present at the pressure output.

Optionally, the third pressure input is provided on the first valve.

Optionally, the first valve is a solenoid valve. The task of the first valve is either to allow an auxiliary pressure to pass through or to block this, which can be performed particularly simply and effectively by a solenoid valve since this can be opened or closed depending on the energizing state. Also, a solenoid valve is a simple, generally favorable and low-maintenance type of valve.

Optionally, the solenoid valve is configured so as to be energized in regular operation and conduct the pressure present at the pressure input to the second valve.

Optionally, the solenoid valve is configured so as to be not energized in emergency operation and, thus, to isolate the pressure present at the pressure input from the second valve.

Optionally, the second valve is a piston valve which is controlled by the auxiliary pressure provided by the first valve. A piston valve is also a simple, economic and low-maintenance type of valve.

Optionally, the first valve is configured so as to vent the auxiliary pressure (philf) present at the second valve in emergency operation on transition back to regular operation. In a case in which the first valve is initially in regular operation, then switches to emergency operation and then is moved back to regular operation, thus, the auxiliary pressure present at the second valve can be vented and regular operation continued without further intervention. Such a case could occur for example if the first valve is an electrically operated solenoid valve, wherein a transient failure of the power supply at the magnet leads to emergency operation and then back to regular operation.

FIG. 1 shows an emergency brake valve system 10 according to the prior art. It shows a pressure output 4A and three pressure inputs 1A, 2A, 3A. An output pressure pAus set by the emergency brake valve system 10 is provided at the pressure output 4A. A regulated pressure pger is present at the pressure input 1A, a static pressure pstat at the pressure input 2A, and an auxiliary pressure philf at the pressure input 3A. The output pressure pAus is set by a solenoid valve 11 and a piston valve 12 which are situated within the emergency brake valve system.

In regular state, the solenoid valve 11 is energized so that it conducts the auxiliary pressure philf to the piston valve 12. There, the auxiliary pressure philf actuates the piston valve 12 such that the piston valve isolates the static pressure pstat and conducts the regulated pressure pger to the pressure output 4A. Thus in regular state, the regulated pressure pger is present at the pressure output A4 and, thus, constitutes the output pressure pAus.

If the power supply to the solenoid valve 11 is interrupted and emergency braking is therefore necessary, the auxiliary pressure philf is isolated by the piston valve 12. In this case, the piston valve 12 conducts a static pressure pstat to the pressure output 4A so that now the static pressure pstat is available as the output pressure. Thus an emergency braking is provided.

If the solenoid valve 11 is energized and at the same time there is no auxiliary pressure philf at the pressure input 3A, the piston valve 12 is also not actuated and the static pressure pstat is provided as the output pressure pAus at the pressure output 4A. An emergency braking is therefore also provided in this case.

The described arrangement of the emergency brake valve leads to the brake logic shown in FIG. 2. If energizing of the solenoid valve is guaranteed and an auxiliary pressure philf is present at the pressure input 3A, the regulated pressure pger is available as the output pressure pAus. If however either energizing of the solenoid valve 11 fails or the auxiliary pressure philf is no longer available at the pressure input 3A, or both cases occur, the static pressure pstat is provided as the output pressure pAus at the pressure output 4A and an emergency braking is initiated.

Figures 3, 4:
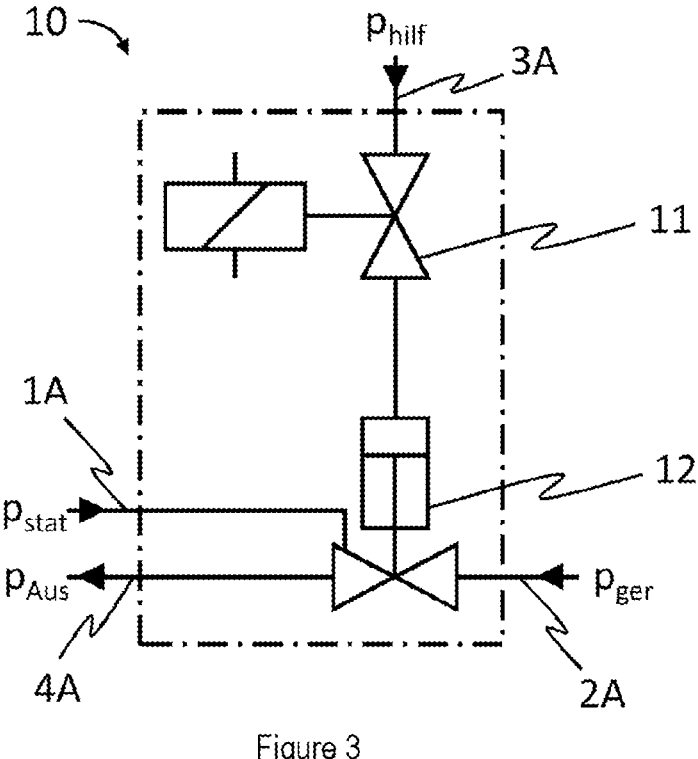
FIG. 3 an emergency brake valve system according to the disclosed embodiments.
FIG. 4 a table to illustrate the provision of the output pressure with an emergency brake valve according to the disclosed embodiments.

FIG. 3 shows an embodiment of an emergency brake valve system 10 according to the invention in a brake controller of part of a train. It is pointed out that in the present embodiment, several such brake controllers and hence emergency brake valve systems are present in a train. Also, the emergency brake valve system according to the invention has a pressure output 4A at which the output pressure pAus is provided. In addition, the emergency brake valve system according to the invention also contains a solenoid valve 11 and the piston valve 12, and three pressure inputs 1A, 2A, 3A. However, in comparison with the prior art, the pressure loading at the inputs is different. Whereas the auxiliary pressure philf is still present at the pressure input 3A, in the emergency brake valve system according to the invention, the static pressure pstat is provided at the pressure input 1A and the regulated pressure pger at the pressure input 2A. Thus in comparison with the prior art, the static pressure pstat and the regulated pressure pger are swapped over at the respective pressure inputs.

The solenoid valve 11 in the emergency brake valve system according to the invention is configured such that when energized, it isolates the auxiliary pressure philf from the piston valve 12. Thus the piston valve 12 is not actuated, and the regulated pressure pger is conducted from the pressure input 2A to the pressure output 4A and made available as the output pressure pAus.

If the solenoid valve 11 is not energized, then the auxiliary pressure philf is conducted to the piston valve 12, whereby the regulated pressure pger is isolated and, instead, the static pressure pstat is conducted to the pressure output 4A and made available as the output pressure pAus.

If no auxiliary pressure philf is present at the pressure input 3A, the piston valve 12 is not actuated and the regulated pressure pger is made available as the output pressure pAus.

The arrangement shown in FIG. 3 and described above leads to the logic illustrated in FIG. 4 for the output pressure pAus. For the case that both the auxiliary pressure philf is available and the solenoid valve 11 is energized, i.e. in regular operation, a regulated pressure pger is present as the output pressure pAus.

If there is no auxiliary pressure philf at the pressure input 3A, the regulated pressure pger then nonetheless constitutes the output pressure pAus. It must be stated that the absence of the auxiliary pressure occurs purely locally, i.e. in one of several brake controllers of the train at the same time, since the auxiliary pressure is not made available to all brake systems via a central main air line. In this case, the braking of the train may be ensured by the brake systems in the other cars, whereby no emergency braking need be initiated on failure of the auxiliary pressure.

If the auxiliary pressure philf is indeed available but the energizing of the solenoid valve 11 is not guaranteed, the static pressure pstat is provided as the output pressure pAus and emergency braking is initiated.

After an emergency braking, in which the static pressure pstat was made available as the output pressure, then by removing (disconnecting) the auxiliary pressure philf, the static pressure pstat can be isolated from the pressure output 4A and hence is no longer present at the brake cylinder, but is replaced by the regulated pressure pger. This is then available as the output pressure pAus. In this way, after an emergency braking, the brakes can simply be released and the vehicle towed away, but the brake pressure pbr can still be controlled via the regulated pressure pger where present.

Figure 5:
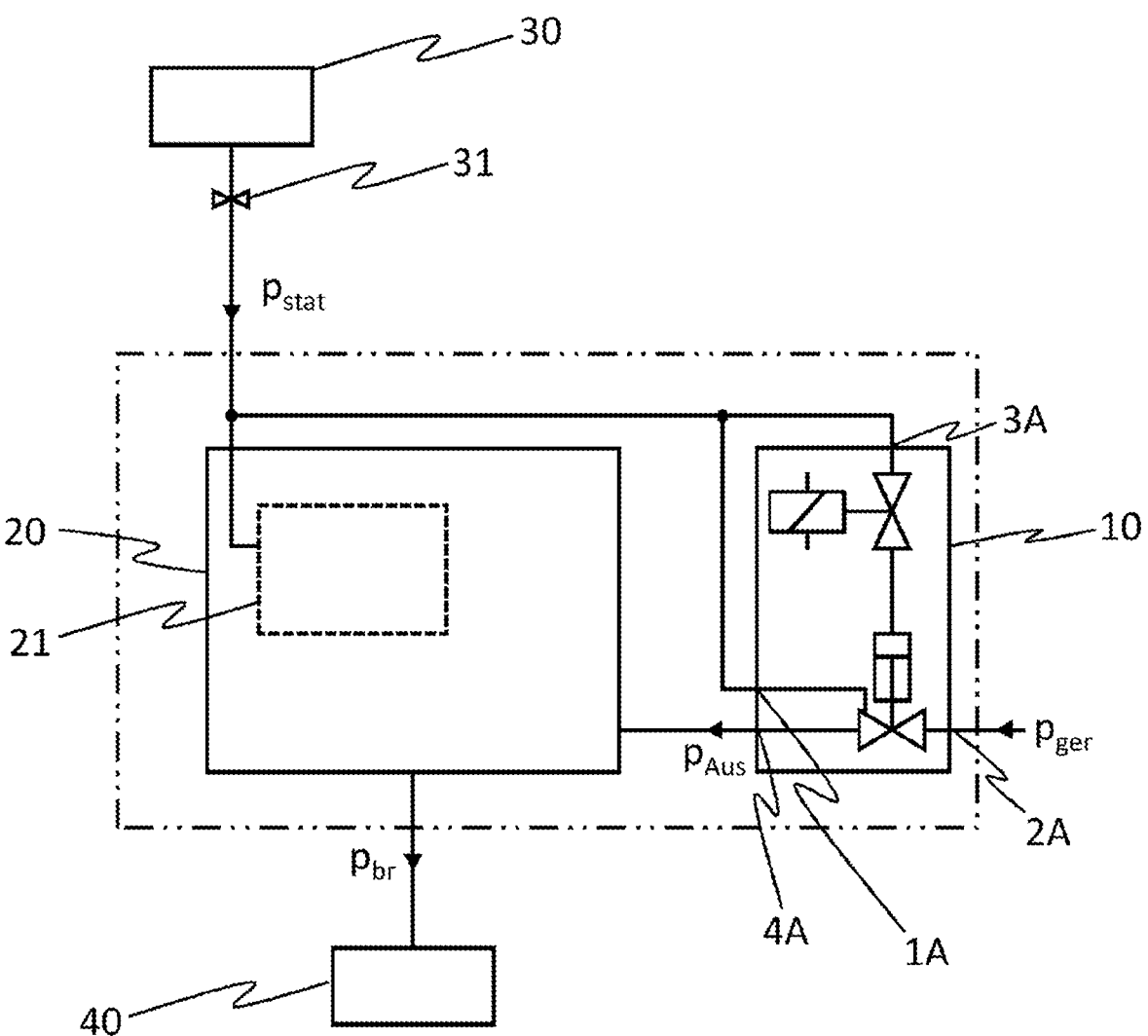
FIG. 5 a part of a system architecture in which the emergency brake valve system is integrated.

FIG. 5 shows a part of a system architecture in which the emergency brake valve system 10 is integrated. The static pressure pstat is made available by a pressure container 30 and conducted to a pressure regulator 20, and via the pressure inputs 1A and 3A to the emergency brake valve system 10. The auxiliary pressure philf (in FIG. 3) is, thus, identical to the static pressure pstat (FIG. 3). In regular operation, the regulated pressure pger is made available as the output pressure pAus and conducted to the pressure regulator 20. Inside the pressure regulator is a control circuit 21 which regulates the static pressure pstat from the pressure container 30. In regular operation, both the pressure regulated by the control circuit 21 and also the output pressure pAus of the emergency brake valve may be conducted to the brake cylinders 40 (not shown) as a brake pressure pbr. For safety reasons, the two pressures are superposed and the respective higher pressure is conducted to the brake cylinders 40. Furthermore, an isolating valve 31 is provided on the pressure container 30, via which the supply of static pressure pstat to the brake system can be suppressed and the pressure present in the lines between the isolating valve 31 and the pressure regulator 20 or emergency brake valve 10 can be vented.

In the case of an emergency braking, if the static pressure pstat is present at the pressure output 4A, this is conducted by the pressure regulator 20 to the brake cylinders 40 as the brake pressure pbr. After the vehicle has stopped however, the regulated pressure pger—where available—should be applied to the brake cylinders 40 as the brake pressure pbr, for example in order to tow the vehicle. Optionally, this is achieved in that the solenoid valve is re-energized after the emergency braking, the auxiliary pressure philf present at the piston valve 12 is vented via a path in the solenoid valve 11, and hence the piston valve 12 again conducts the regulated pressure pger to the pressure output 4A. If it is not possible to energize the solenoid valve 11, the regulated pressure pger can nonetheless be conducted to the pressure output 4A in that the static pressure pstat in the lines between the isolating valve 31 and the emergency brake valve 10 is isolated by the isolating valve 31 and vented. In this way the piston valve 12 is actuated and the regulated pressure is present at the pressure output 4A as the output pressure pAus. Thus an adjustable brake pressure pbr can be provided by the pressure regulator, via which a controlled braking as possible, for example in the case of towing after an emergency braking. This is achieved by venting the static pressure and isolating the static pressure from the emergency brake valve, so that because of the emergency brake valve according to the invention, the regulated pressure is again available as the brake pressure.

LIST OF REFERENCE SIGNS

10 Emergency brake valve system
11 First valve (solenoid valve)
12 Second valve (piston valve)
20 Pressure regulator
21 Control circuit
30 Pressure container
31 Isolating valve 40 Brake cylinder
1A First pressure input
2A Second pressure input
3A Third pressure input
4A Pressure output
$p_{ger}$ Regulated pressure
$p_{stat}$ Static pressure
$p_{hilf}$ Auxiliary pressure
$p_{Aus}$ Output pressure
$p_{br}$ Brake pressure

The invention claimed is:

1. An emergency brake valve system for a pneumatic brake system of a vehicle, the system comprising:
a first valve;
a second valve, and
an auxiliary pressure configured to be provided via an input to the pneumatic brake system,
wherein the first valve is configured to conduct the auxiliary pressure to and isolate the auxiliary pressure from the second valve,
wherein the second valve is configured to provide either a static pressure or a regulated pressure depending on the auxiliary pressure,
wherein the first valve is configured to isolate the auxiliary pressure from the second valve in regular operation so that the second valve provides the regulated pressure, and
wherein the first valve is configured to conduct the auxiliary pressure to the second valve in emergency operation so that the second valve provides the static pressure,
wherein the first valve is configured to further vent the auxiliary pressure present at the second valve in the emergency operation in transition to regular operation so that the second valve provides the regulated pressure.

2. The emergency brake valve system of claim 1, wherein the pressure provided by the second valve is an output pressure of the emergency brake valve system.

3. The emergency brake valve system of claim 1, wherein an output pressure of the emergency brake valve system is the brake pressure of the pneumatic brake system.

4. The emergency brake valve system of claim 1, wherein a first pressure input and/or a second pressure input are provided on the second valve.

5. The emergency brake valve system of claim 1, wherein a third pressure input is provided on the first valve.

6. The emergency brake valve system of claim 1, wherein the pressure output is provided on the second valve.

7. The emergency brake valve system of claim 1, wherein the first valve is a solenoid valve.

8. The emergency brake valve system of claim 7, wherein the solenoid valve is configured to be energized in regular operation and conduct the pressure present at the pressure input to the second valve.

9. The emergency brake valve system of claim 8, wherein the solenoid valve is configured to be not energized in emergency operation thereby isolating the pressure present at the pressure input from the second valve.

10. The emergency brake valve system of claim 1, wherein the second valve is a piston valve.

* * * * *